(12) United States Patent
Nakayama

(10) Patent No.: US 10,234,030 B2
(45) Date of Patent: Mar. 19, 2019

(54) MOTOR CONTROLLER

(71) Applicant: DENSO CORPORATION, Kariya, Aichi-pref. (JP)

(72) Inventor: Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/440,359

(22) Filed: Feb. 23, 2017

(65) Prior Publication Data

US 2017/0248229 A1    Aug. 31, 2017

(30) Foreign Application Priority Data

Feb. 26, 2016    (JP) .................................. 2016-35218

(51) Int. Cl.
| | |
|---|---|
| *F16H 61/32* | (2006.01) |
| *H02K 1/14* | (2006.01) |
| *H02P 8/06* | (2006.01) |
| *H02K 11/21* | (2016.01) |
| *H02K 1/24* | (2006.01) |
| *F16H 63/34* | (2006.01) |

(52) U.S. Cl.
CPC ............. *F16H 61/32* (2013.01); *H02K 1/146* (2013.01); *H02K 11/21* (2016.01); *H02P 8/06* (2013.01); *F16H 63/3458* (2013.01); *F16H 2061/326* (2013.01); *H02K 1/24* (2013.01)

(58) Field of Classification Search
None
See application file for complete search history.

(56) References Cited

U.S. PATENT DOCUMENTS

| | | | |
|---|---|---|---|
| 2009/0000411 A1 | 1/2009 | Nakayama et al. | |
| 2016/0102761 A1* | 4/2016 | Kuwahara | ............... F16H 61/24 74/473.12 |

FOREIGN PATENT DOCUMENTS

JP    5375775    12/2013

* cited by examiner

*Primary Examiner* — Timothy Hannon
(74) *Attorney, Agent, or Firm* — Nixon & Vanderhye P.C.

(57) ABSTRACT

A motor controller includes a first forward driver rotating a motor in a forward rotation direction, a torque short determiner determining short of a switch torque, a backward driver driving the motor up to an extreme position in the backward rotation direction in a switch torque short case, and a second forward driver rotating the motor from the extreme position to a target position. When the second forward driver drives the motor, a drive objet is rotated not only by a motor torque but also by a twist backlash torque from a rotation transmission part. Further, after a rotation of the motor in the forward rotation direction, the backward rotation operation of the motor is performed only in the switch torque short case, thereby reducing a shift position switch time in a switch torque sufficient case.

10 Claims, 15 Drawing Sheets

MOTOR CONTROLLER

CROSS REFERENCE TO RELATED APPLICATION

The present application is based on and claims the benefit of priority of Japanese Patent Application No. 2016-035218, filed on Feb. 26, 2016, the disclosure of which is incorporated herein by reference.

TECHNICAL FIELD

The present disclosure generally relates to a motor controller for controlling a motor that serves as a power source of a shift-by-wire system in a vehicle.

BACKGROUND INFORMATION

In the conventional shift-by-wire system that changes/switches a shift position by using a shift position switch mechanism of an automatic transmission, the switch mechanism is driven by a rotary actuator in which a motor is installed. Such a shift-by-wire system has an increased freedom of position arrangement and design of a shifter in a vehicle, because the shifter needs not be mechanically connected with the shift position switch mechanism.

In case that a vehicle is parked on a slope, the gravity dragging the vehicle down on the slope is transmitted via an axle and is applied to an engagement part between a park gear and a park pole in the shift position switch mechanism. Therefore, when releasing the engagement of the park gear and the park pole (i.e., when shifting from a park position to a different position, which may be designated hereafter as a park-release shift), change/switching of a shift position requires a greater torque when the vehicle is parked on the slope than when parked on a flat land. Further, a torque of the motor may change when a power source voltage changes, or when a resistance of motor winding changes according to a motor temperature change. Thus, when the motor is put in a severe condition such as having a low power source voltage, having a high motor temperature or the like, an output torque of the motor may fall down to a smaller value.

In a patent document, Japanese patent No. 5375775 (patent document 1), a technique for securely changing the shift position from the park position (i.e., securely performing a park-release shift) in such a severe condition described above is disclosed, in which a motor controller of the shift-by-wire system first performs a backward rotation operation of the motor in a backward rotation direction relative to a shift position switching direction by a small amount, and then performs a forward rotation operation of the motor in the shift position switching direction, thereby increasing the kinetic energy of a drive object toward the shift position switching direction. The reverse rotation operation of the motor is performed (i) whenever the shift position is changed/switched from the park position, or (ii) when the sever condition of the power source voltage or the motor temperature is detected, or (iii) when the vehicle is parked on the slope.

In the motor controller disclosed in the patent document 1, every time the shift position is changed/switched from the park position, the backward rotation of the motor is performed, which takes time and leads to an undesirable increase of a shift position switch time. Further, when the power source voltage is relatively low, or when the motor temperature is relatively high, or when the vehicle is parked on the slope, the backward rotation of the motor is always performed, i.e., even in case that the shift position change/switching is successfully performable without the backward rotation of the motor.

SUMMARY

It is an object of the present disclosure to provide a motor controller that enables a reduction of the shift position switch time.

In an aspect of the present disclosure, a motor controller for controlling a motor that serves as a drive power source of a shift-by-wire system for a rotational drive of a drive object in a shift position switch mechanism of a vehicle includes a first forward driver, a torque short determiner, a backward driver, and a second forward driver. The first forward driver rotates the motor in a forward rotation direction that is defined as a direction from a start position to a target position, when the start position of motor rotation is defined as a position of motor rotation at a start time of switching of a shift position. The torque short determiner determines whether a switch torque applied to the drive object for switching the shift position is short of required magnitude, based on a current position and a target position of motor rotation, when the motor is under a rotation control to rotate in the forward rotation direction. The backward driver rotates the motor up to an extreme in a backward rotation direction that is defined as a direction from the target position to the start position, when the switch torque is determined to be short of required magnitude. The second forward driver rotates the motor in the forward rotation direction from the extreme to the target position.

According to the above, when the switch torque is short of the required magnitude, the drive object stops rotating, while a rotation transmission part between the motor and the drive object is being twisted in the forward rotation direction. Therefore, at a time of backward motor rotation by the backward driver, the rotation torque of the drive object is not only from the backward motor rotation but also from the backlash of the twist of the rotation transmission part, i.e., the rotation torque of the backward rotation is a sum of the two torques from the motor and the backlash of the rotation transmission part. Therefore, when the motor rotates to the extreme (i.e., to one of both end positions of the rotatable range), the rotation transmission part is twisted in the backward rotation direction by a large amount.

Thus, when the motor is rotated by the second forward driver, the drive object is rotated in the forward rotation direction not only by the motor torque from the motor but also by the backlash torque from the rotation transmission part. That is, when the motor is driven/rotated by the second forward driver, the switch torque is greater than the switch torque by the motor rotation by the first forward driver. Thus, according to the present disclosure, even in a situation of parking on the slope or the like which requires a greater switch torque than the parking on a flatland, shifting from the park position to a different position is enabled.

Further, when the voltage of the power source is relatively low, when the motor temperature is relatively high, or when the vehicle is parked on a slope, i.e., when the motor is put in a severe condition, the motor is rotated in the forward rotation direction in the first place, and, only when the switch torque is determined as short, the backward motor rotation is performed. Therefore, in a situation in which the shifting from the park position to a different position is successfully performable without the backward motor rotation, the required time for such a shifting, i.e., the switching of the shift position, is reduced.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, a plurality of embodiments of the present disclosure is described based on the drawings. The same numerals are assigned to the substantially same configuration/component in the following embodiments, and description of the same configuration/component will not be repeated.

First Embodiment

The motor controller in the first embodiment of the present disclosure is applied to a shift-by-wire system in a vehicle.

Figure 1:
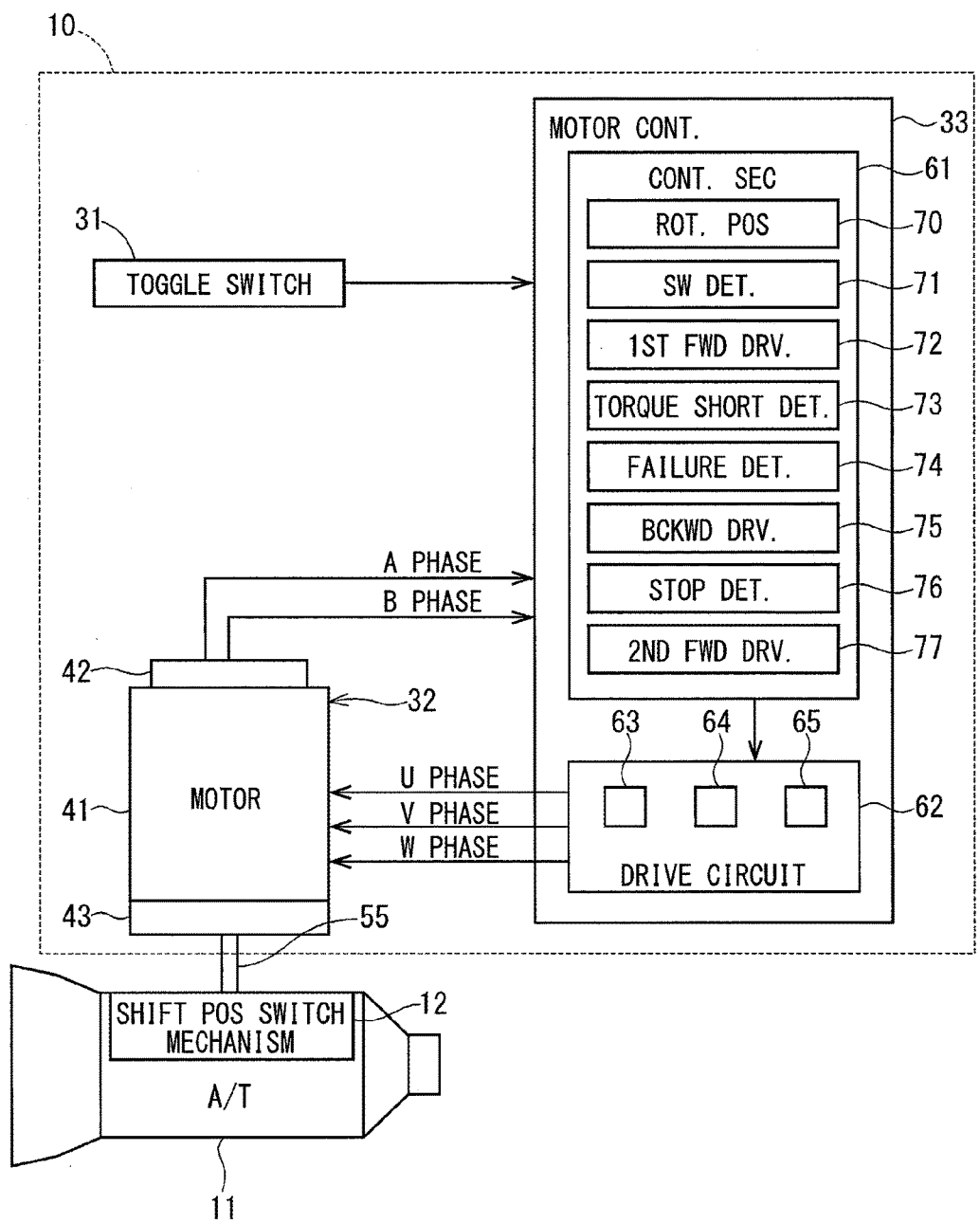
FIG. 1 is a block diagram of a shift-by-wire system having a motor controller in a first embodiment of the present disclosure.

As shown in FIG. 1, a shift-by-wire system 10 is a system that operates a shift position switch mechanism 12 of an automatic transmission 11.

(Shift Position Switch Mechanism)

Figure 2:
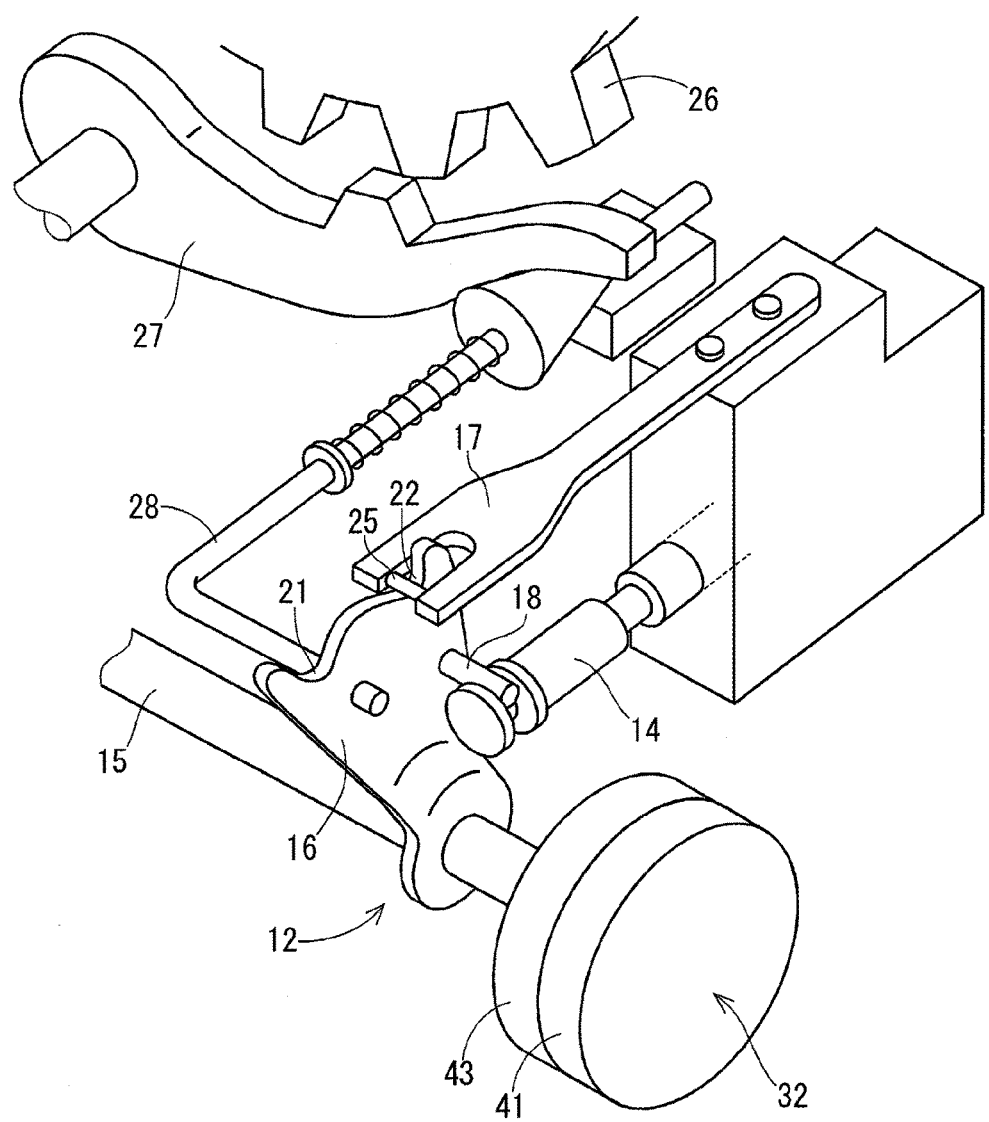
FIG. 2 is a perspective view of a shift position switch mechanism of an automatic transmission in FIG. 1.

First, the shift position switch mechanism 12 is described with reference to FIG. 2.

The shift position switch mechanism 12 switches/changes an operation position of a position switch valve 14 provided in a hydraulic control circuit of the automatic transmission 11 for switching the shift position, and is provided with a control rod 15, a detent plate 16, and a board spring 17.

The control rod 15 is connected with a rotary actuator 32 of the shift-by-wire system 10. The detent plate 16, which is fixedly attached to the control rod 15, rotates together with the control rod 15 in one body. A spool of the position switch valve 14 receives an axial direction component of the movement of the detent plate 16 via a pin 18 when the detent plate 16 rotates. Two concaves 21 and 22 are provided, i.e., formed, on an outer edge section of the detent plate 16.

As for the board spring 17, one end part is fixedly attached to a fixed member of the automatic transmission 11, and the other end part of the spring 17 is provided with an engager 25 formed thereon. The engager 25 engages with the outer edge section of the detent plate 16. The operation position of the position switch valve 14 is held, i.e., kept unchanged, when the engager 25 gets into the concave 21 or into the concave 22.

In the present embodiment, the engagement of the engager 25 with the concave 21 corresponds to a park position, and the engagement of the engager 25 with the concave 22 corresponds to a non-park position.

The shift position switch mechanism 12 is further provided with a park gear 26, a park pole 27, and a park rod 28.

The park gear 26 is fixedly attached to an output shaft of the automatic transmission 11, and rotates together with the output shaft in one body.

The park pole 27 is detachably and engageably disposed from/to the park gear 26, and when engaging to the park gear 26, the park pole 27 regulates/restricts rotation of the park gear 26, and locks, i.e., stops the rotation of, the output shaft of the automatic transmission 11.

The park rod 28 brings the park pole 27 closer to the park gear 26 in the park position. The park rod 28 brings the park pole 27 away from the park gear 26 in the non-park position.

(Shift-by-Wire System)

Figure 3:
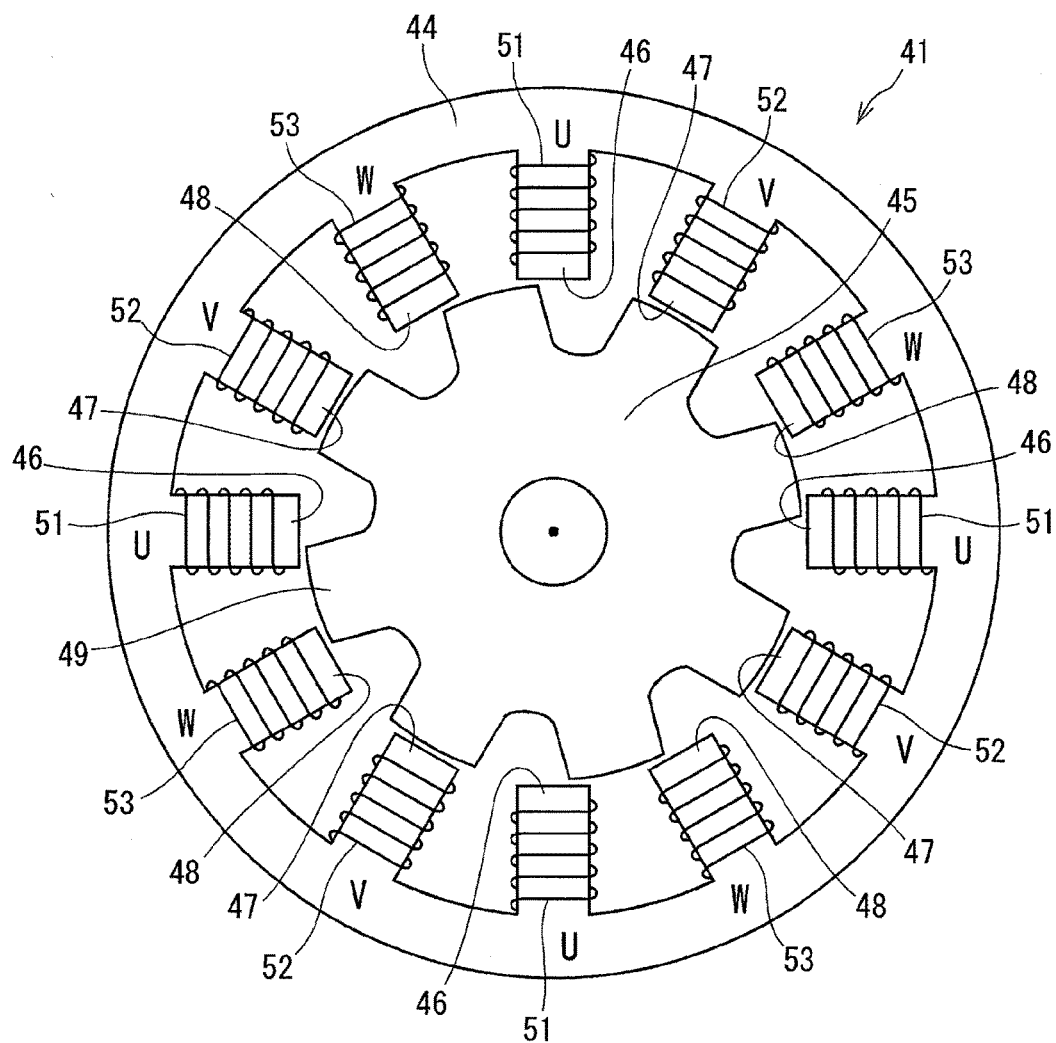
FIG. 3 is a section of the motor shown in FIG. 1.

Next, the shift-by-wire system 10 is described with reference to FIGS. 1 and 3.

As shown in FIG. 1, the shift-by-wire system 10 is provided with a toggle switch 31, the rotary actuator 32, and a motor controller 33.

The toggle switch 31 is a switch that is turned to ON and OFF by a driver of the vehicle, and, when the toggle switch 31 is turned to ON, the shift position is switched to the park position.

The rotary actuator 32 is provided with a motor 41, an encoder 42, and a speed reduction gear 43 that reduces a rotation speed of the motor 41. As shown in FIG. 3, the motor 41 of the present embodiment is a switched-reluctance motor, in which a stator core 44 and a rotor 45 respectively have a salient pole. Twelve salient poles 46, 47, and 48 are formed on an inner periphery of the stator core 44 at equal intervals, for example, and eight salient poles 49 are formed on an outer periphery of the rotor 45 at equal intervals, for example.

The salient pole 49 faces with each of the salient poles 46, 47, and 48 in turn with a fine/small gap as the rotor 45 rotates. A U phase winding 51, a V phase winding 52, and a W phase winding 53 are wound around the salient poles 46, 47, and 48, respectively. When magnetic attraction from each of the three phase windings attracts the rotor 45 by the switching of the power supply phases to those windings, the rotor 45 rotates.

Returning the description to FIG. 1, the encoder 42 is implemented as a magnetic type rotary encoder, for example, and outputs a pulse signal of an A phase and a B phase to the motor controller 33 in synchronization with the rotation of the rotor 45 of the motor 41.

The motor controller 33 is provided with a control section 61 and a drive circuit 62.

By determining whether to perform a shift position switch control according to an output signal of the toggle switch 31, the encoder 42 or the like, the control section 61 determines a power supply phase of the motor 41 according to the output signal of the encoder 42 when performing the shift position switch control, and instructs the drive circuit 62 to operate accordingly.

The drive circuit 62 has switching elements 63, 64, and 65 that respectively perform a switching operation based on the instruction from the control section 61, and generates the revolving magnetic field by suitably switching the power supply state of the windings 51, 52, and 53.

(Motor Controller)

Next, the details of the configuration of the control section 61 of the motor controller 33 are described with reference to FIG. 1.

In the following, the rotation position of the motor 41 at the time of starting the shift position switching is designated as a start position. Further, the rotation position of the motor 41 corresponding to the target shift position is designated as a target position. The target shift position is known from the output signal of the toggle switch 31.

As shown in FIG. 1, the control section 61 is provided with a rotation position detector 70, a switch determiner 71, a first forward driver 72, a torque short determiner 73, a failure determiner 74, a backward driver 75, a stop determiner 76, and a second forward driver 77.

The rotation position detector 70 detects the rotation position of the motor 41 based on the output signal of the encoder 42.

The switch determiner 71 determines, when (i) the motor 41 is not rotated and (ii) the rotation position and the target position of the motor 41 are different from each other, that a switch request of the shift position is issued, and outputs a shift position switch instruction.

The first forward driver 72 rotates the motor 41 in a forward rotation direction, which is defined as a direction from the start position to the target position, according to the shift position switch instruction.

More specifically, the first forward driver 72 counts a rising edge and a falling edge of the A phase pulse signal and the B phase pulse signal that are outputted from the encoder 42. Then, the power supply phase of the motor 41 is determined according to the counted value (henceforth, an encoder counted value), and the first forward driver 72 sends an instruction to the drive circuit 62. Note that the same method is used for rotating the motor 41 by the backward driver 75 and by the second forward driver 77.

The torque short determiner 73 determines, based on the current position and the target position of the motor 41, whether the torque for rotating the detent plate 16 (i.e., a switch torque applied to the plate 16) is short of the required magnitude (i.e., is insufficient for the switching of the shift position) when the motor 41 is controlled to rotate in the forward rotation direction by the first forward driver 72 or by the second forward driver 77. The detent plate 16 is equivalent to the drive object.

In the present embodiment, the torque short determiner 73 determines that the switch torque is short of the required magnitude when a rotation stop state of the motor 41 continues for a preset lag determination time before the rotation position of the motor 41 reaches the target position.

When the difference of the rotation position and the start position of the motor 41 is greater than a preset angle at the time of torque short determination, the failure determiner 74 determines, for example, that the motor 41, the encoder 42 or the like has a failure, i.e., is broken. The preset angle may be set to a value at which the switch torque is barely required any more for driving/rotating the detent plate 16. That is, in other words, the preset angle is an angle at which the engager 25 reaches a position just passing a peak between the concave 21 and the concave 22.

The backward driver 75 rotates the motor 41 to an extreme position in a backward rotation direction, which is defined as a direction from the target position to the start position, when the switch torque is short of the required magnitude. The extreme position is equivalent to an "extreme" in the claims, and indicates one of both end positions of the rotatable range of the motor 41 (when the motor 41 rotates in an engagement of the detent plate 16).

The stop determiner 76 determines whether a rotation stop state of the motor 41 has continued for a preset stop determination time, after the start of rotation of the motor 41 by the backward driver 75.

The second forward driver 77 rotates the motor 41 in the forward rotation direction from the extreme position to the target position when an affirmative determination is made by the stop determiner 76, which is considered as completion of rotation to the extreme position in the backward rotation direction by the backward driver 75.

In the present embodiment, the control section 61 is made up from a microcontroller etc., for example. The processing in each of the functional sections of the control section 61 is performed as software processing by the execution of a program by a CPU, which may also be performed as hardware processing by a dedicated electronic circuit.

(Process Performed by the Control Section)

Next, the process performed by the control section 61 for switching the shift position is described with reference to FIG. 4. When the shift position switch instruction is outputted, execution of the process of FIG. 4 is started.

Figure 4:
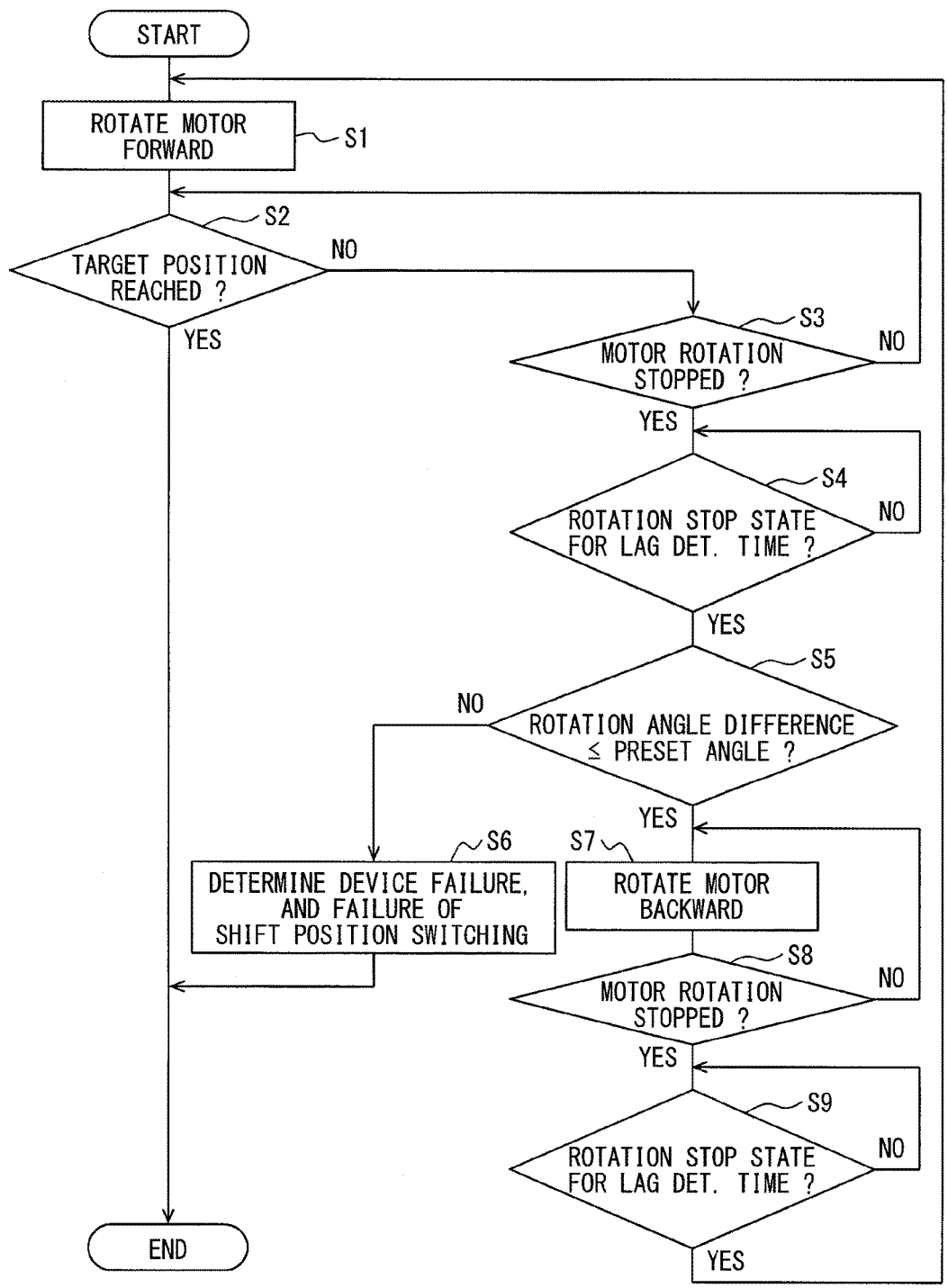
FIG. 4 is a flowchart of a process for switching a shift position by the motor controller in FIG. 1.

In Step S1 of FIG. 4, the first forward driver 72 rotates the motor 41 in the forward rotation direction towards the target position from the start position. The process proceeds to Step S2 after Step S1.

In Step S2, the torque short determiner 73 determines whether the rotation position of the motor 41 has reached the target position. When it is determined that the rotation position of the motor 41 has reached the target position (S2: YES), the process exits from the routine of FIG. 4.

When it is determined that the rotation position of the motor 41 has not reached the target position (S2: NO), the process proceeds to Step S3.

In Step S3, the torque short determiner 73 determines whether rotation of the motor 41 is stopped.

When it is determined that rotation of the motor 41 is stopped (S3: YES), the process proceeds to Step S4.

When it is determined that rotation of the motor 41 is not stopped (S3: NO), the process proceeds, i.e., returns, to Step S2.

In Step S4, the torque short determiner 73 determines whether a rotation stop state of the motor 41 has continued for a preset lag determination time, which is used for determining whether the rotation of the motor 41 is lagging, or is substantially stopping.

When it is determined that the rotation stop state of the motor 41 has continued for the preset lag determination time (S4: YES), the process proceeds to Step S5.

When it is determined that the rotation stop state of the motor 41 has not continued for the preset lag determination time (S4: NO), the process repeats Step S4.

In Step S5, the failure determiner 74 determines whether the difference between the rotation position and the start position of the motor 41 is equal to or less than a preset angle, at a time when an affirmative determination is made in Step S4, i.e., when it is determined that the switch torque is short of the required magnitude.

When it is determined that the difference between the rotation position and the start position of the motor 41 is greater than the preset angle (S5: YES), the process proceeds to Step S6.

When it is determined that the difference between the rotation position and the start position of the motor 41 is equal to or less than the preset angle (S5: NO), the process proceeds to Step S7.

In Step S6, the failure determiner 74 determines a failure of the motor 41, the encoder 42 or the like, for example, and also determines a failure of the switching of the shift position.

The Process Exits from the Routine of FIG. 4 after Step S6.

In Step S7, the backward driver 75 rotates the motor 41 to the extreme position in the backward rotation direction. The process proceeds to Step S8 after Step S7.

In Step S8, the stop determiner 76 determines whether rotation of the motor 41 is stopped after the start of rotation of the motor 41 by the backward driver 75.

When it is determined that rotation of the motor 41 is stopped (S8: YES), the process proceeds to Step S9.

When it is determined that rotation of the motor 41 is not stopped (S8: NO), the process proceeds, i.e., returns, to Step S7.

In Step S9, the stop determiner 76 determines whether the rotation stop state of the motor 41 has continued for the preset stop determination time.

When it is determined that the rotation stop state of the motor 41 has continued for the preset stop determination time (S9: YES), the process proceeds, i.e., returns, to Step S1.

When it is determined that the rotation stop state of the motor 41 has not continued for the preset stop determination time (S9: NO), the process repeats Step S9.

Effects of the Present Disclosure

As described above, in the first embodiment, the motor controller 33 is provided with the first forward driver 72, the torque short determiner 73, the backward driver 75, and the second forward driver 77.

The first forward driver 72 rotates the motor 41 in the forward rotation direction from the start position to the target position.

The torque short determiner 73 determines, based on the rotation position and the target position of the motor 41, whether the switch torque is insufficient, i.e., short of the required magnitude, when the motor 41 is controlled to rotate in the forward rotation direction.

The backward driver 75 rotates the motor 41 to the extreme position in the backward rotation direction, when the switch torque is short of the required magnitude.

The second forward driver 77 rotates the motor 41 in the forward rotation direction from the extreme position to the target position.

Figure 5:
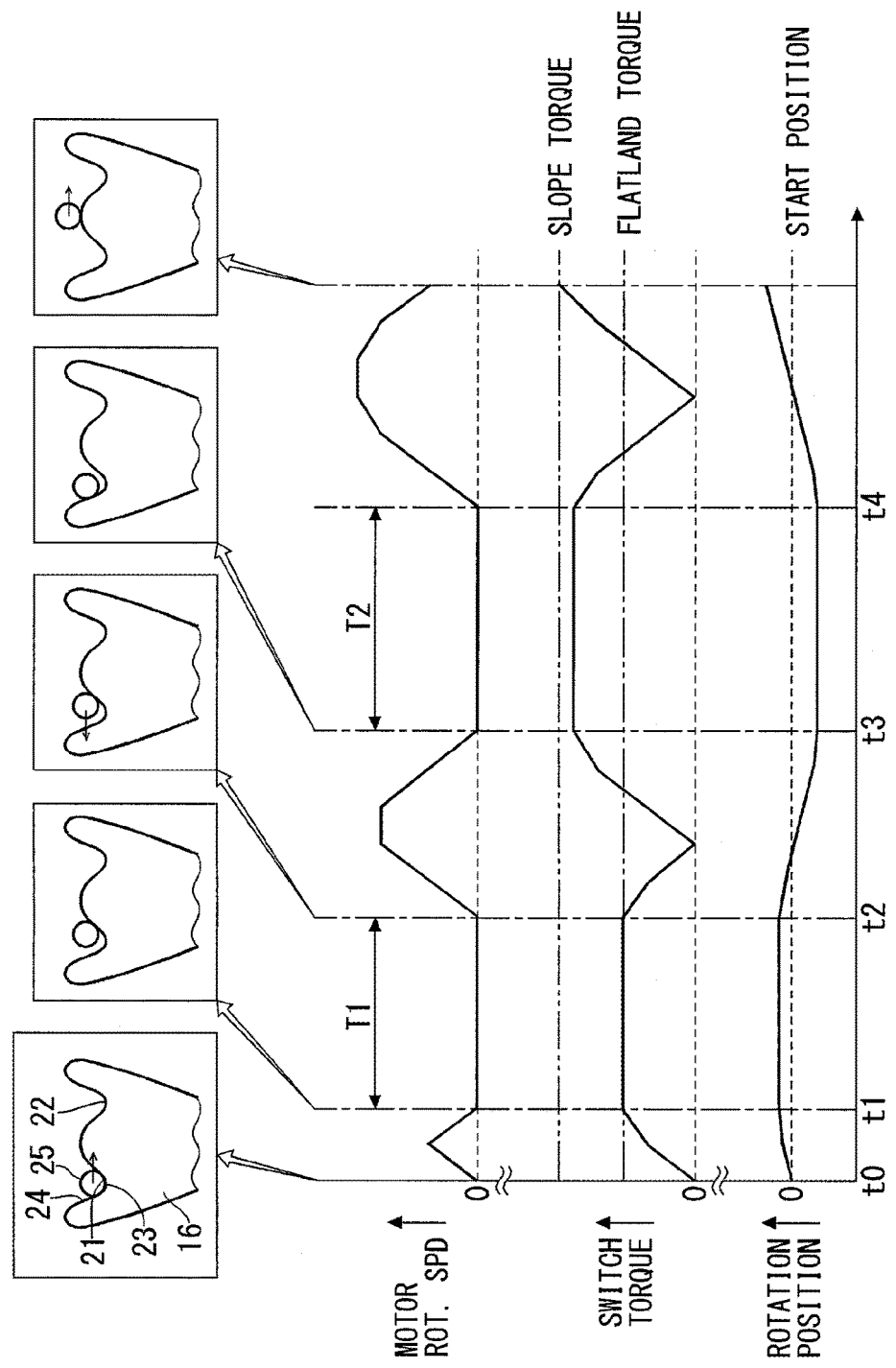
FIG. 5 is a time chart of a motor rotation position, a switching torque, and a motor rotation speed when the shift position is switched by the motor controller in FIG. 1.

As shown in FIG. 5, after a start of rotation of the motor 41 by the first forward driver 72 at time to, in case that rotation of the motor 41 is stopped at time t1, it is determined that the switch torque is insufficient at time t2, i.e., when a lag determination time T1 has lapsed from time t1.

When the switch torque is insufficient, rotation of the detent plate 16 stops, with the rotation transmission part (e.g., the rotation shaft and the control rod 15 of the speed reduction gear 43) from the motor 41 to the detent plate 16 being twisted in the forward rotation direction.

Therefore, when the backward driver 75 rotates the motor 41, the detent plate 16 is driven/rotated by both of the motor torque and the backlash torque from the rotation transmission part. That is, in addition to the motor torque, the backlash torque of the rotation transmission part, which comes from a release of twist of the rotation transmission part, is applied to the detent plate 16 to rotate the plate 16 in the backward rotation direction.

Thereby, when the motor 41 rotates to the extreme position by the backward driver 75 (i.e., at time t3), the rotation transmission part is twisted in the backward rotation direction by a large amount. At the extreme position, the engager 25 is pressed against a P wall 24, which is one of two inner walls of the concave 21 facing a valley 23 of the concave 21 and the concave 22 of the detent plate 16.

Therefore, when the second forward driver 77 rotates the motor 41 at time t4, i.e., at a time after a lapse of a stop determination time T2 from time t3, in addition to the motor torque, the backlash torque of the rotation transmission part, which comes from a release of twist of the rotation transmission part, in the forward rotation direction is applied to the detent plate 16.

Therefore, when the second forward driver 77 rotates the motor 41, compared with the rotation of the motor 41 by the first forward driver 72, the switch torque becomes larger.

According to the first embodiment, even in a situation in which a greater switch torque is required for switching a shift position than the shift position switching on a flatland, e.g., when a vehicle is parked on a slope, switching the shift position from the park position to a different position is enabled.

Further, even when the motor 41 is put in the severe condition, e.g., when the power source voltage is relatively low, when the motor temperature is relatively high, or when the vehicle is parked on a slope, the motor 41 is rotated in the forward rotation direction first, and the backward rotation of the motor 41 is performed only when the switch torque is short of the required magnitude.

Therefore, in a situation in which switching of the shift position from the park position to a different position is performable without performing the backward rotation of the motor 41, a required time for switching the shift position is reduced.

Note that, even though FIG. 5 illustrates a situation of switching from the park position to the non-park position, the process shown in FIG. 4 can also be used for the switching from the non-park position to the park position.

Further, in the first embodiment, the torque short determiner 73 determines that the switch torque is insufficient, when the rotation stop state of the motor 41 has continued for the lag determination time T1 of preset amount before the current position reaches the target position.

In such manner, whether the switch torque is insufficient is determinable.

Further, in the first embodiment, the stop determiner 76 determines whether the rotation stop state of the motor 41 has continued for the stop determination time T2 after the start of rotation of the motor 41 by the backward driver 75. The second forward driver 77 rotates the motor 41 towards the target position, when an affirmative determination is made by the stop determiner 76.

That is, when an affirmative determination is made by the stop determiner 76, it is determined as, i.e., is equated to, a completion of rotation to the extreme position by the backward driver 75. Therefore, at the time of rotation of the motor 41 by the second forward driver 77, the backlash torque is securely generated.

Further, in the first embodiment, when the difference between the current position and the start position at the time of the torque short determination is greater than the preset angle, it is determined that the motor 41, the encoder 42 or the like has a failure, for example.

Thus, it is determinable whether the rotation stop state of the motor 41 is caused by a shortage of the switch torque, or by a failure of the device or the like.

When the cause of the rotation stop state of the motor 41 is a failure of the device, a useless backward rotation drive is avoided.

Further, in the first embodiment, when the switch torque is short of the required magnitude at the time of rotation of the motor 41 by the second forward driver 77, the motor 41 is rotated again by the backward driver 75 in the backward rotation direction, and the rotation transmission part is twisted still further by a larger amount. When such an operation is repeated for plural times, the switch torque is made even greater.

Second Embodiment

Figure 6:
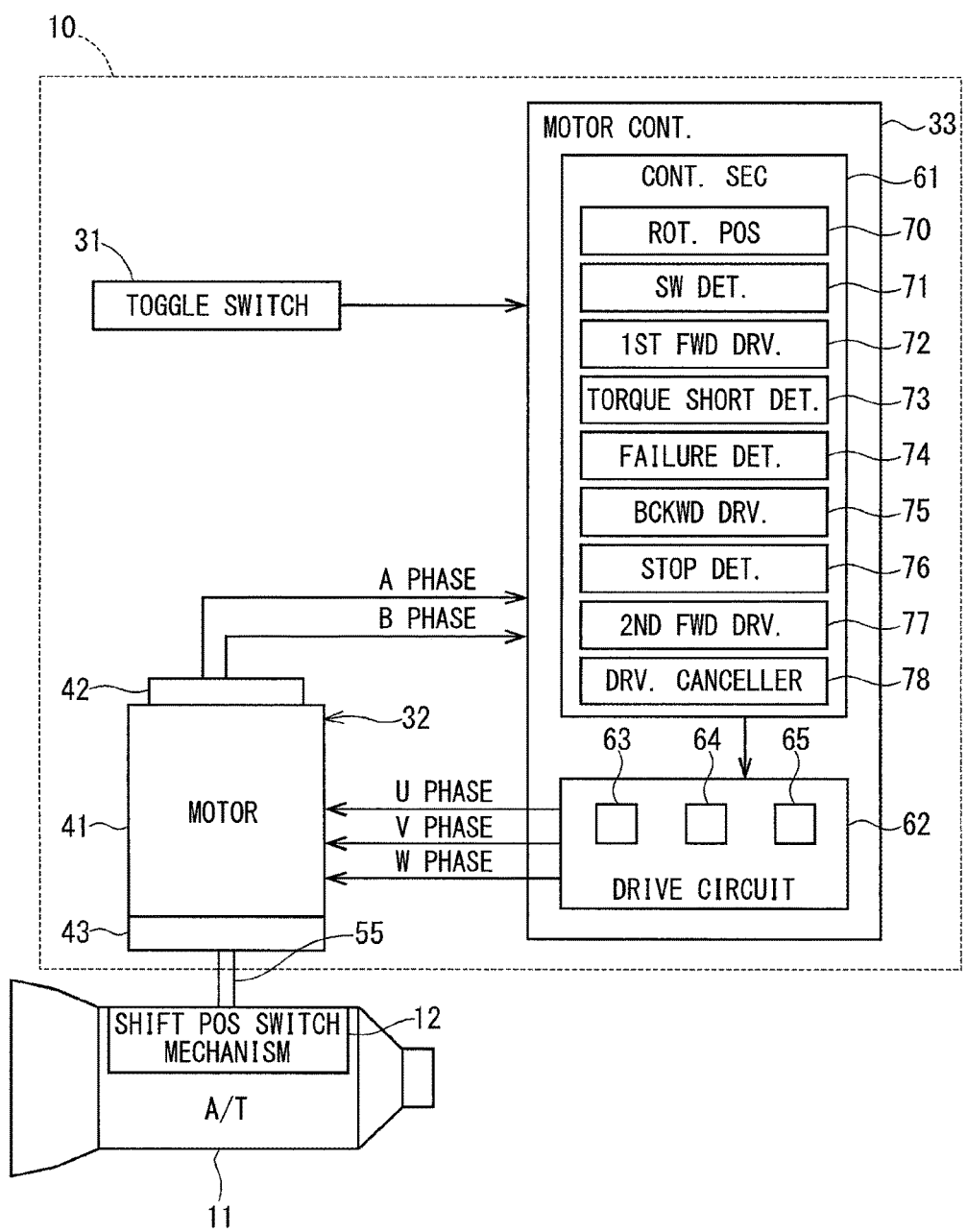
FIG. 6 is a block diagram of the shift-by-wire system having the motor controller in a second embodiment of the present disclosure.

According to the second embodiment, as shown in FIG. 6, the control section 61 is provided with a drive canceller 78.

When the number of drive operations of the motor 41 in the backward rotation direction by the backward driver 75 (i.e., the backward rotation drive number, hereafter) exceeds a preset number, the drive canceller 78 determines that the switching of the shift position is a failure, and stops a rotation drive of the detent plate 16. The drive canceller 78 is equivalent to a drive stopper in the claims.

Figure 7:
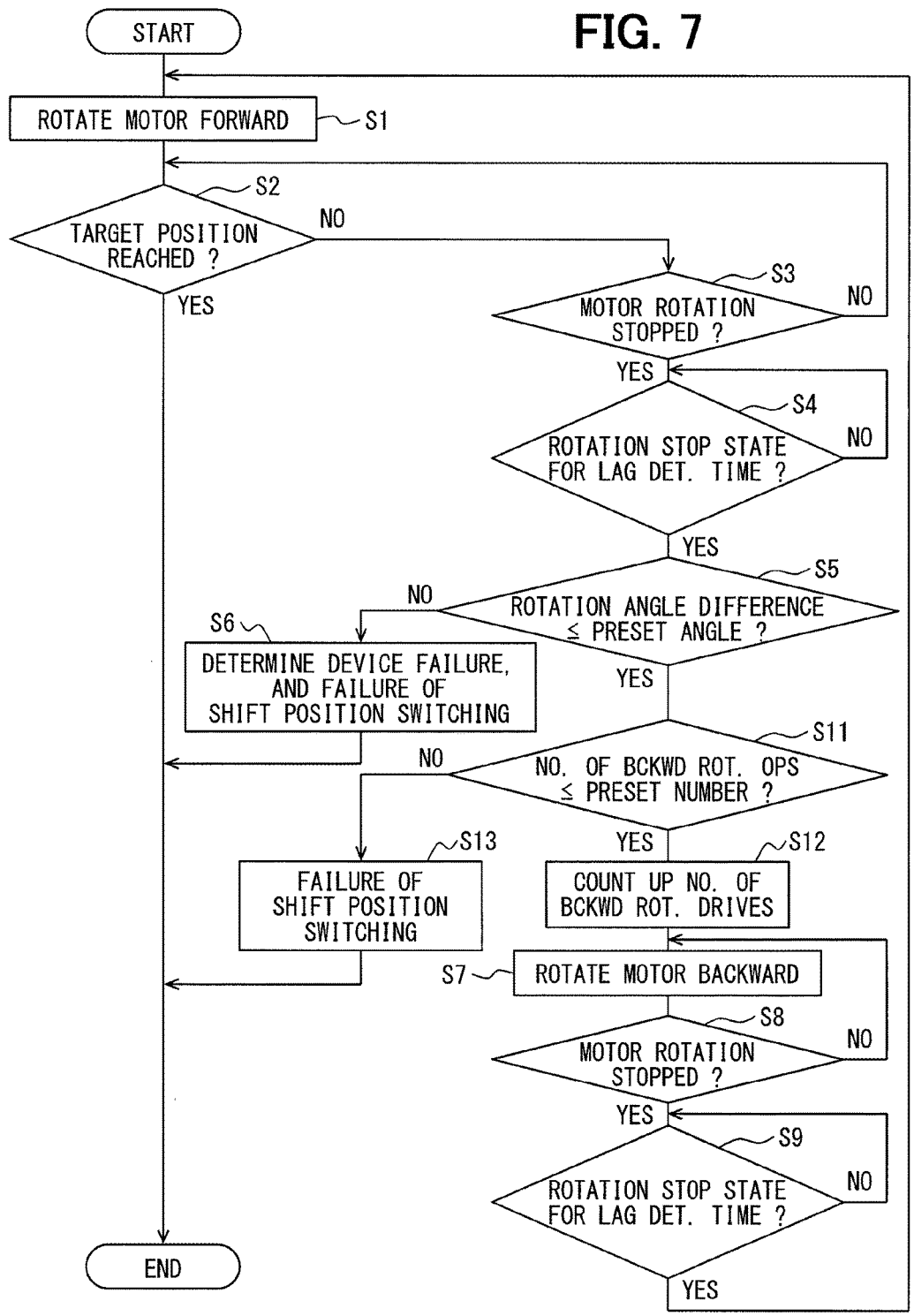
FIG. 7 is a flowchart of a process for switching a shift position by the motor controller in FIG. 6.

The process performed by the control section 61 in the second embodiment is described with reference to a flowchart shown in FIG. 7. In the flowchart of FIG. 7, Step S11 is performed, when a positive determination is made in Step S5.

In Step S11, the drive canceller 78 determines whether the number of backward rotation drives is equal to or less than the preset number.

When it is determined that the number of backward rotation drives is equal to or less than the preset number (S11: YES), the process proceeds to Step S12.

When it is determined that the number of backward rotation drives exceeds the preset number (S11: NO), the process proceeds to Step S13.

In Step S12, the drive canceller 78 counts up the number of backward rotation drives. The process proceeds to Step S7 after Step S12.

In Step S13, the drive canceller 78 determines that the switching of the shift position is a failure, and stops the rotation drive of the detent plate 16. The process exits from the routine of FIG. 7 after Step S13.

As mentioned above, in the second embodiment, when the number of backward rotation drives exceeds the preset number, the drive canceller 78 determines that the switching of the shift position is a failure, and stops the rotation drive of the detent plate 16.

In such manner, breakage of the rotation transmission part due to a too-much switch torque, which may be caused by an increase of the number of backward rotation drives, is prevented.

Third Embodiment

Figure 8:
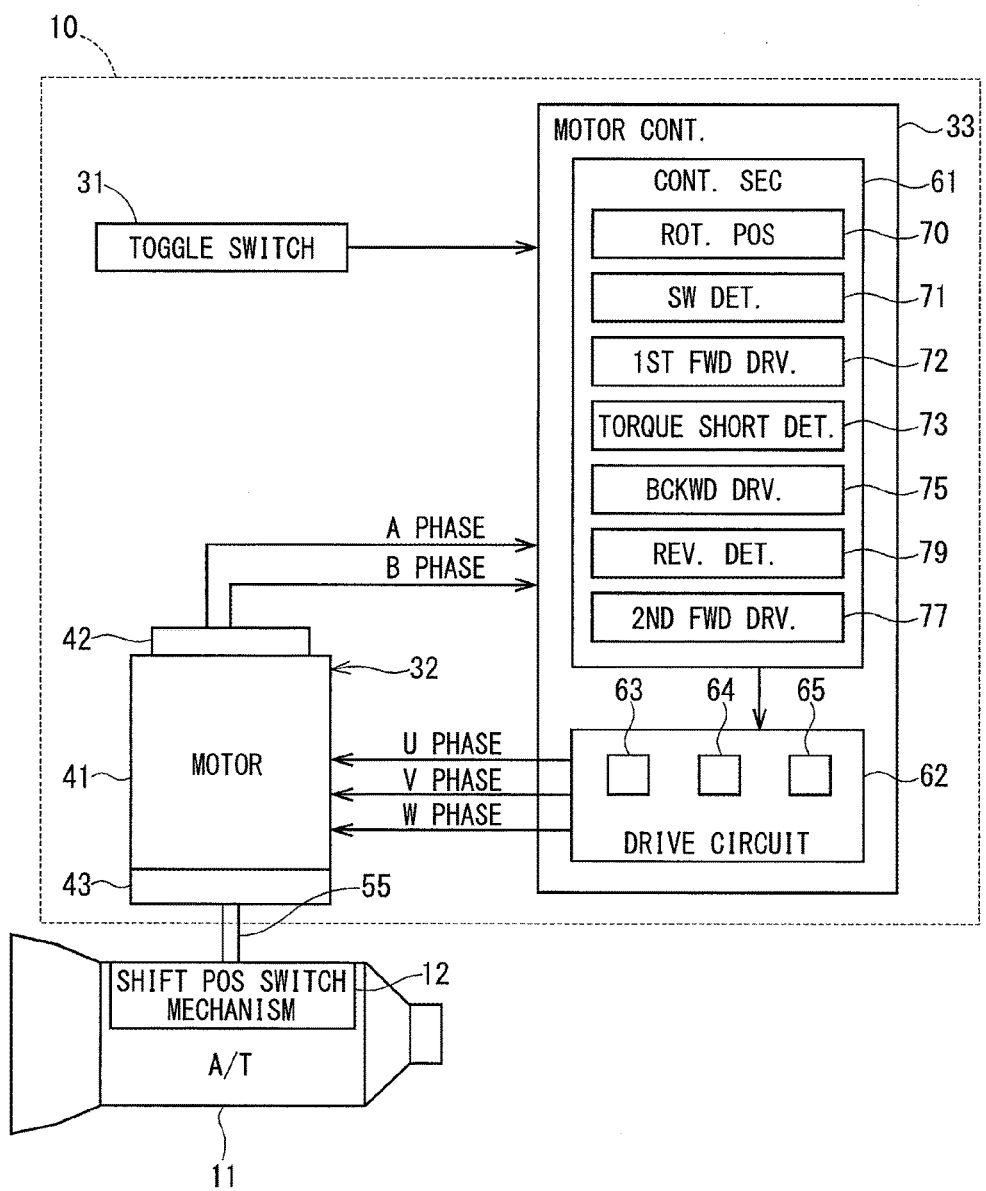
FIG. 8 is a block diagram of the shift-by-wire system having the motor controller in a third embodiment of the present disclosure.

According to the third embodiment, as shown in FIG. 8, the torque short determiner 73 determines that the switch torque is insufficient, when the rotation direction of the motor 41 is reversed before the rotation position of the motor 41 reaches the target position.

Further, the control section 61 has, instead of having the stop determiner 76 of the first embodiment, a reverse determiner 79. The reverse determiner 79 determines whether rotation of the motor 41 is reversed after the start of rotation of the motor 41 by the backward driver 75.

The second forward driver 77 rotates the motor 41 in the forward rotation direction towards the target position, when an affirmative determination is made by the reverse determiner 79 (i.e., when rotation of the motor 41 is reversed after the start of rotation of the motor 41 by the backward driver 75).

Figure 9:
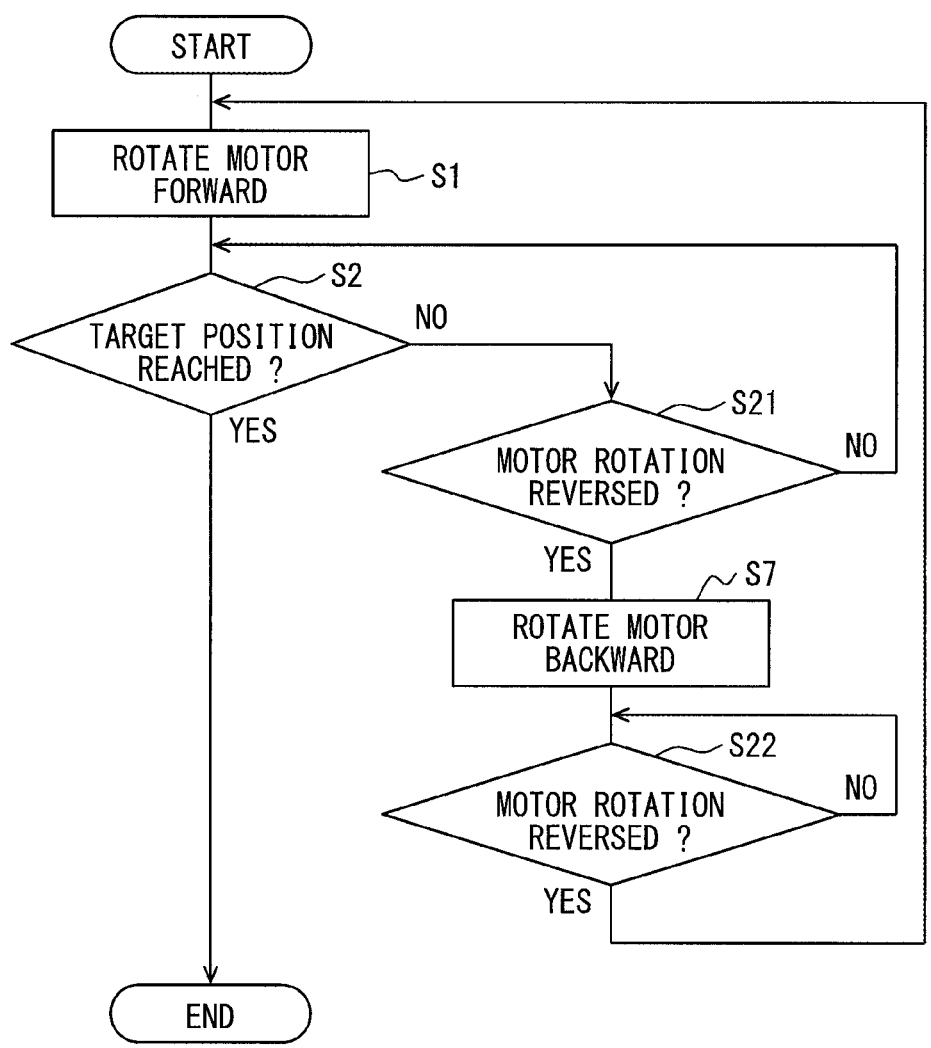
FIG. 9 is a flowchart of a process for switching a shift position by the motor controller in FIG. 8.

The process performed by the control section 61 in the third embodiment is described with reference to a flowchart shown in FIG. 9. In Step S21 of FIG. 9, which is performed when a negative determination is made in Step S2, the torque short determiner 73 determines whether the rotation direction of the motor 41 is reversed, before the rotation position of the motor 41 reaches the target position.

When it is determined that rotation of the motor 41 has been reversed (S21: YES), the process proceeds to Step S7.

When it is determined that rotation of the motor 41 is not reversed (S21: NO), the process proceeds, i.e., returns, to Step S2.

In Step S22, which is performed after Step S7, the reverse determiner 79 determines whether rotation of the motor 41 is reversed after the start of rotation of the motor 41 by the backward driver 75.

When it is determined that rotation of the motor 41 has been reversed (S22: YES), the process proceeds, i.e., returns, to Step S1.

When it is determined that rotation of the motor 41 is not reversed (S22: NO), the process repeats Step S22.

As mentioned above, in the third embodiment, the torque short determiner 73 determines that the switch torque is insufficient, when the rotation direction of the motor 41 is reversed before the rotation position of the motor 41 reaches the target position.

Thus, in such manner, whether the switch torque is insufficient is determinable. Further, rather than performing the backward rotation drive after detecting a stop of rotation of the motor 41, the required time for the switching of the shift position is reduced by performing the backward rotation drive upon detecting the reverse of the motor rotation direction.

Further, in the third embodiment, the reverse determiner 79 determines whether rotation of the motor 41 is reversed after the start of rotation of the motor 41 by the backward driver 75. Then, the second forward driver 77 rotates the motor 41 in the forward rotation direction towards the target position, when an affirmative determination is made by the reverse determiner 79.

That is, when an affirmative determination is made by the reverse determiner 79, it is determined as, i.e., is equated to, a completion of rotation to the extreme position by the backward driver 75. Therefore, at the time of rotation of the motor 41 by the second forward driver 77, the backlash torque is securely generated.

Fourth Embodiment

Figure 10:
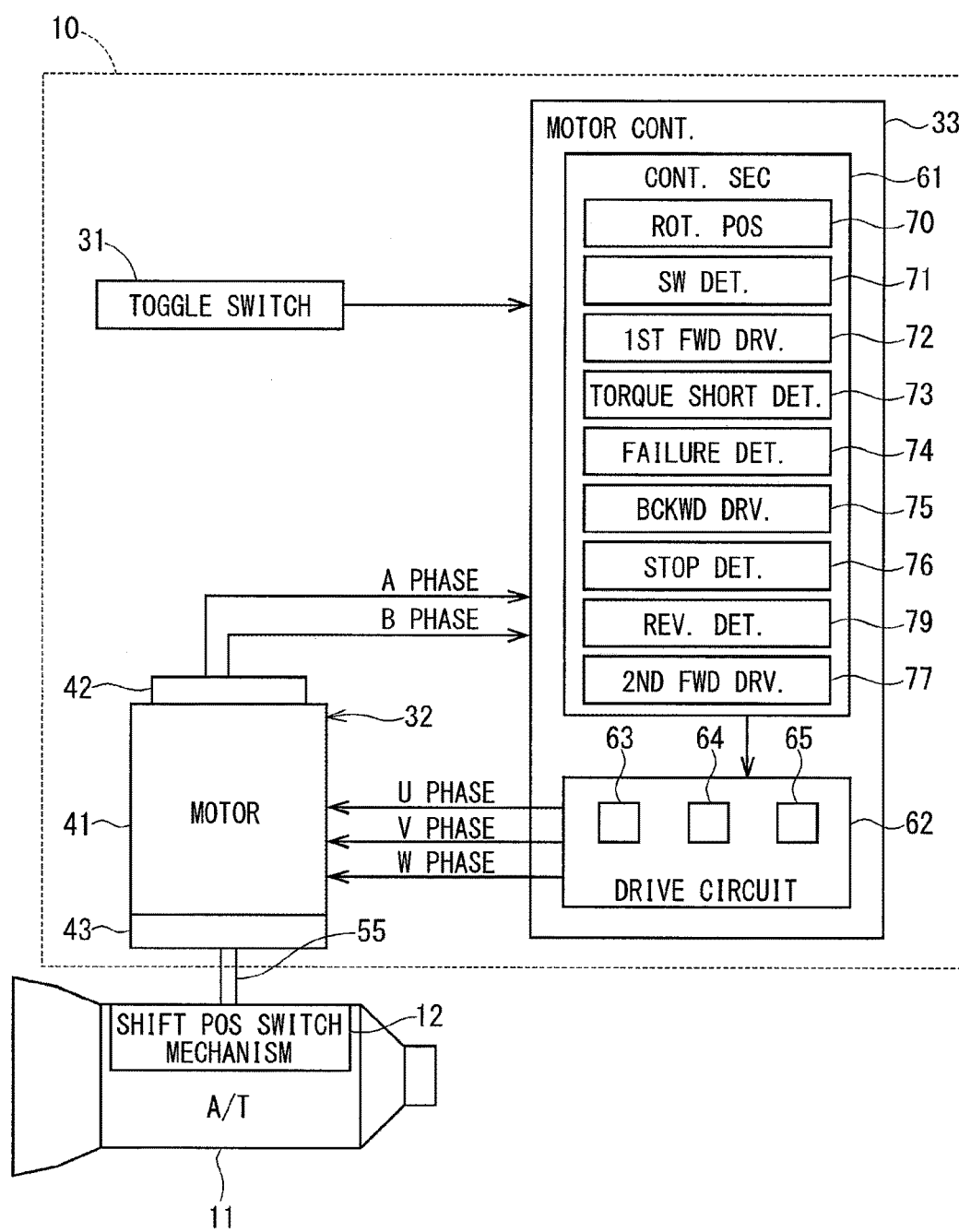
FIG. 10 is a block diagram of the shift-by-wire system having the motor controller in a fourth embodiment of the present disclosure.

The fourth embodiment is a combination of the first embodiment and the third embodiment. That is, as shown in FIG. 10, the torque short determiner 73 determines that the switch torque is insufficient, when the rotation stop state of the motor 41 continues for the lag determination time, or when the rotation direction of the motor 41 is reversed before the rotation position of the motor 41 reaches the target position. Further, the control section 61 is provided with the stop determiner 76 and the reverse determiner 79.

Figure 11:
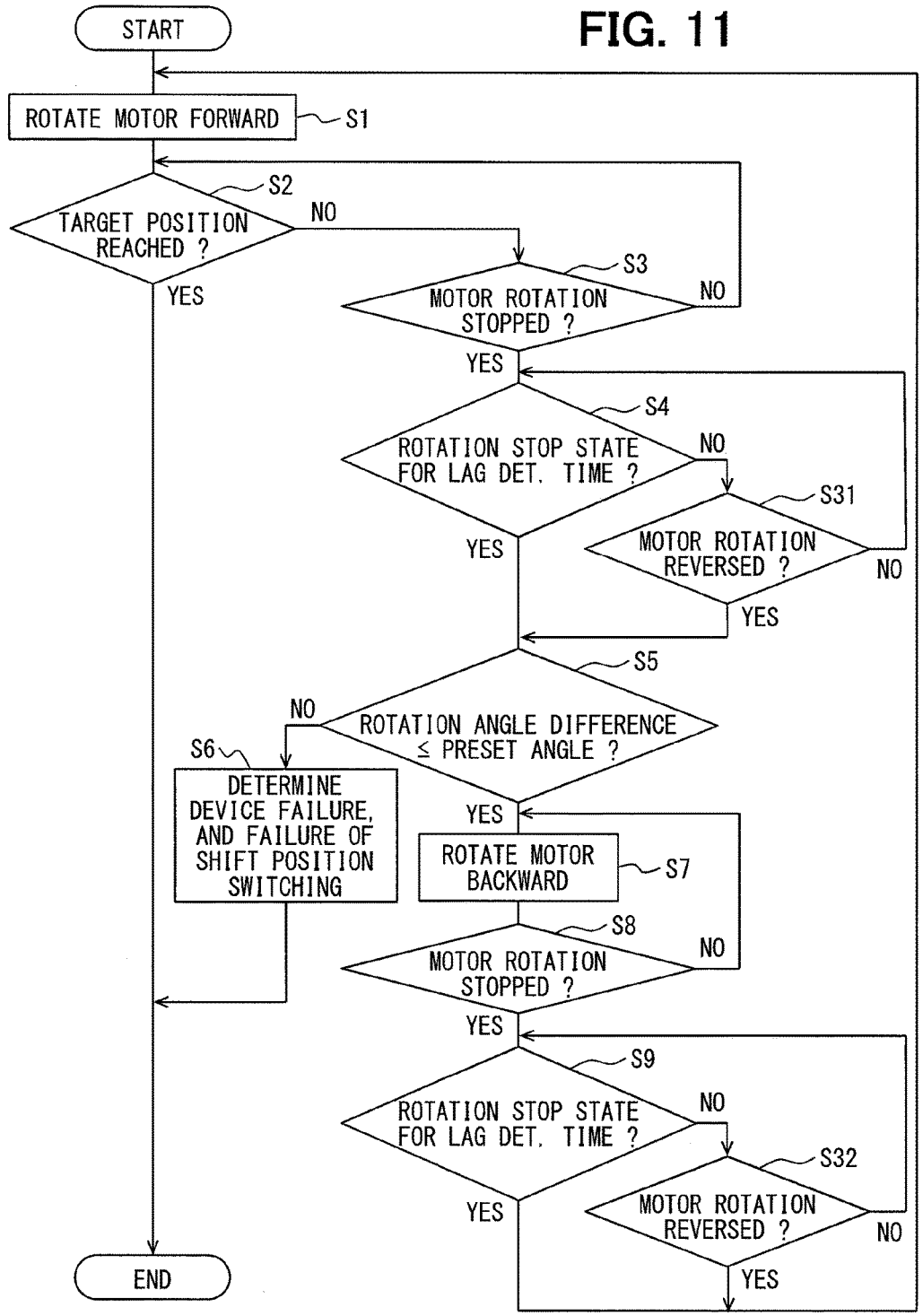
FIG. 11 is a flowchart of a process for switching a shift position by the motor controller in FIG. 10.

The process performed by the control section 61 in the fourth embodiment is described with reference to a flowchart in FIG. 11. In Step S31 of FIG. 11, which is performed when a negative determination is made in Step S4, the torque short determiner 73 determines whether the rotation direction of the motor 41 is reversed, before the rotation position of the motor 41 reaches the target position.

When it is determined that rotation of the motor 41 has been reversed (S31: YES), the process proceeds to Step S5.

When it is determined that rotation of the motor 41 is not reversed (S31: NO), the process proceeds, i.e., returns, to Step S4.

In Step S32 performed after Step S9, the reverse determiner 79 determines whether rotation of the motor 41 is reversed after the start of rotation of the motor 41 by the backward driver 75.

When it is determined that rotation of the motor 41 has been reversed (S32: YES), the process proceeds, returns, to Step S1.

When it is determined that rotation of the motor 41 is not reversed (S32: NO), the process proceeds, i.e., returns, to Step S9.

Fifth Embodiment

Figure 12:
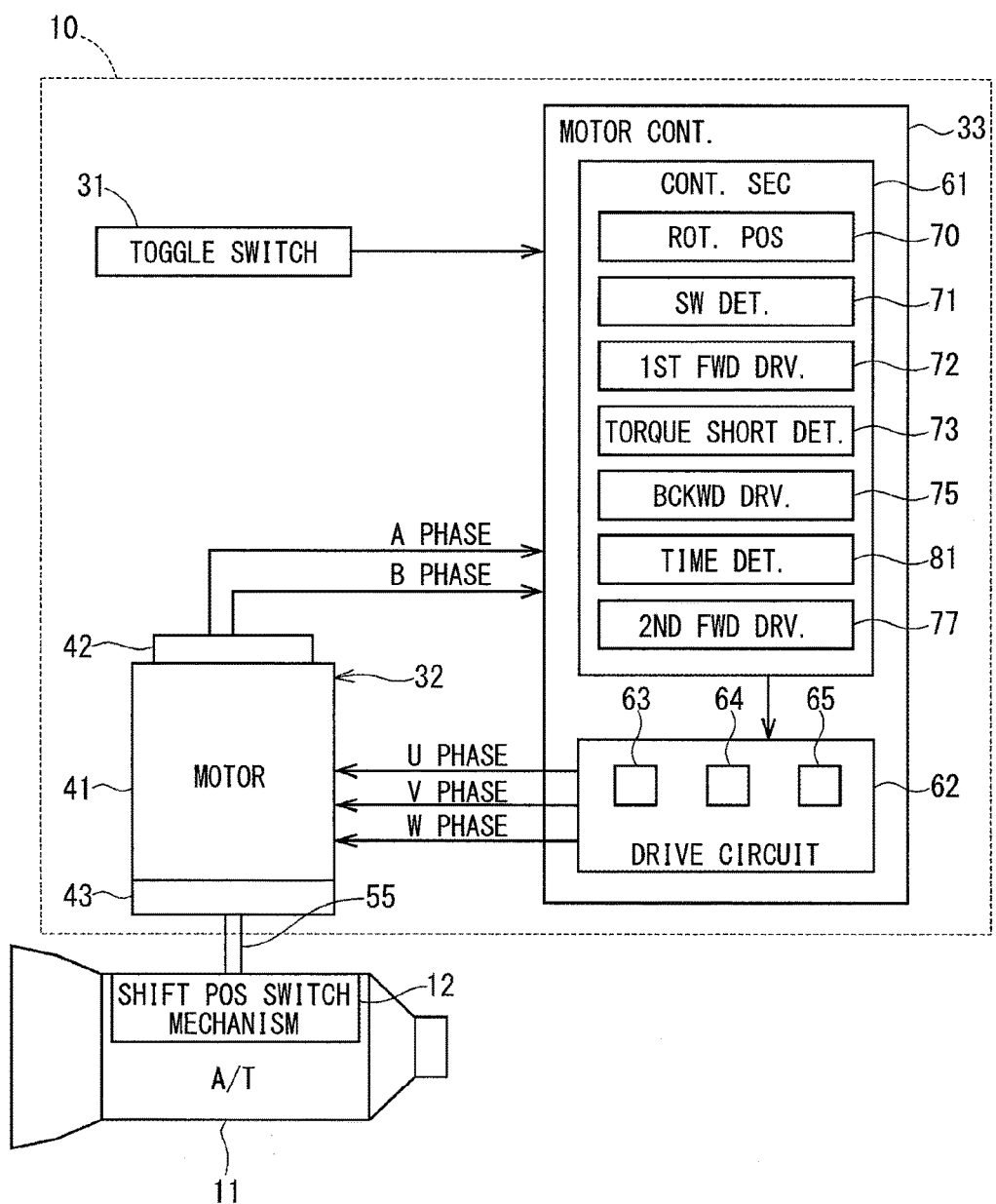
FIG. 12 is a block diagram of the shift-by-wire system having the motor controller in a fifth embodiment of the present disclosure.

According to the fifth embodiment, as shown in FIG. 12, the torque short determiner 73 determines that the switch torque is insufficient, when a preset limit time has lapsed after the start of rotation of the motor 41 by the first forward driver 72. The preset limit time is equivalent to a preset drive time in the claims.

Further, the control section 61 has, instead of having the stop determiner 76 of the first embodiment, a time determiner 81. The time determiner 81 determines whether a preset limit time has lapsed after the start of rotation of the motor 41 by the backward driver 75.

The second forward driver 77 rotates the motor 41 in the forward rotation direction towards the target position, when an affirmative determination is made by the time determiner 81 (i.e., when the preset limit time has lapsed after the start of rotation of the motor 41 by the backward driver 75).

Figure 13:
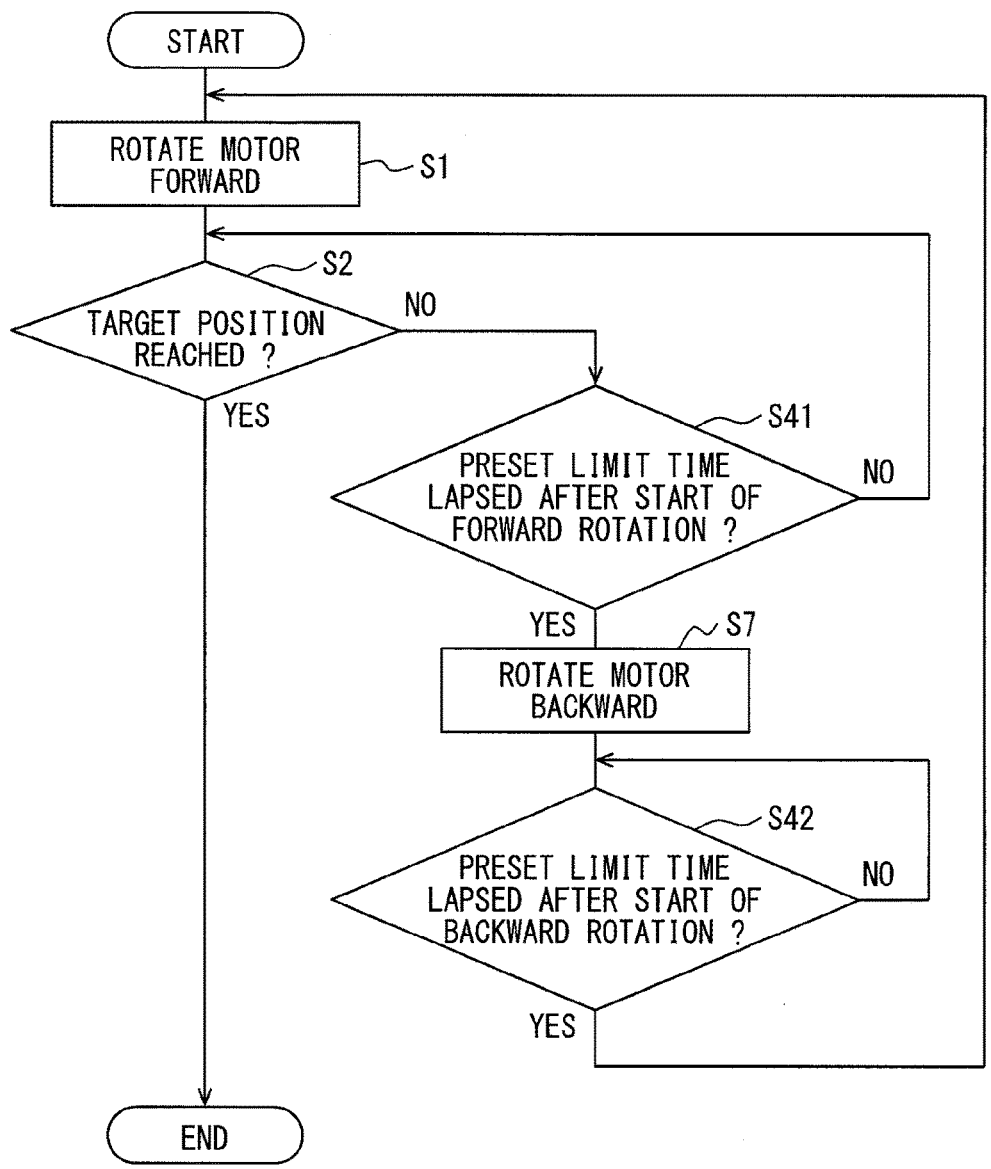
FIG. 13 is a flowchart of a process for switching a shift position by the motor controller in FIG. 12.

The process performed by the control section 61 in the fifth embodiment is described with reference to a flowchart in FIG. 13. In Step S41 of FIG. 13, which is performed when a negative determination is made in Step S2, the torque short determiner 73 determines whether the preset limit time has lapsed after the start of rotation of the motor 41 by the first forward driver 72.

When it is determined that the preset limit time has lapsed (S41: YES), the process proceeds to Step S7.

When it is determined that the preset limit time has not lapsed (S41: NO), the process proceeds, i.e., returns, to Step S2.

In Step S42 which is performed after Step S7, the time determiner 81 determines whether the preset limit time has lapsed after the start of rotation of the motor 41 by the backward driver 75.

When it is determined that the preset limit time has lapsed (S42: YES), the process proceeds, i.e., returns, to Step S1.

When it is determined that the preset limit time has not lapsed (S42: NO), the process repeats Step S42.

As mentioned above, in the fifth embodiment, the torque short determiner 73 determines that the switch torque is insufficient, when the preset limit time has lapsed after the start of rotation of the motor 41 by the first forward driver 72.

In such manner, whether the switch torque is insufficient or not is determinable.

Further, in the fifth embodiment, the time determiner 81 determines whether the preset limit time has lapsed after the start of rotation of the motor 41 by the backward driver 75. Then, the second forward driver 77 rotates the motor 41 in the forward rotation direction towards the target position, when an affirmative determination is made by the time determiner 81 (i.e., when the preset limit time has lapsed after the start of rotation of the motor 41 by the backward driver 75).

That is, when an affirmative determination is made by the time determiner 81, it is determined as, i.e., is equated to, a completion of rotation to the extreme position by the backward driver 75. Therefore, at the time of rotation of the motor 41 by the second forward driver 77, the backlash torque is securely generated.

Sixth Embodiment

Figure 14:
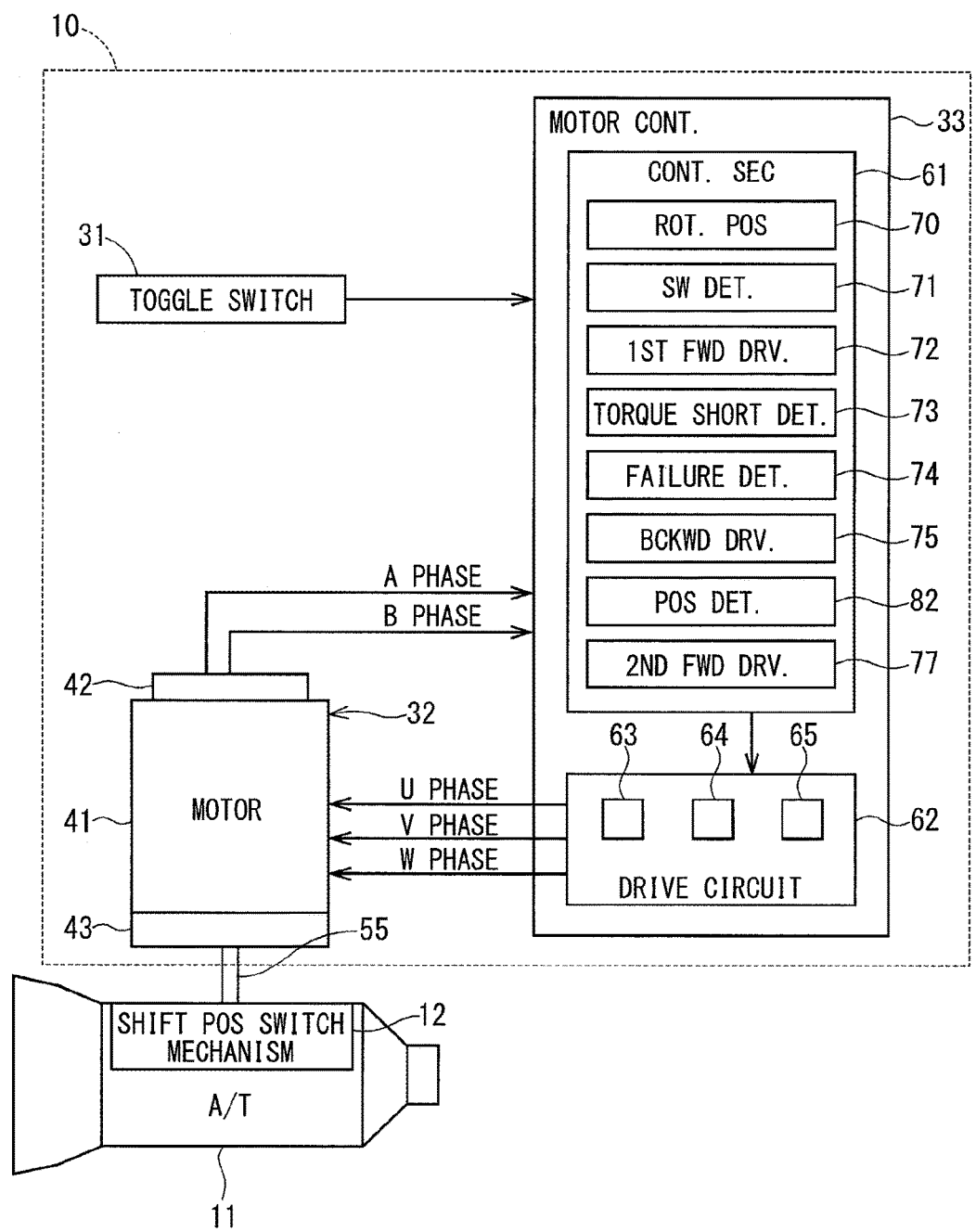
FIG. 14 is a block diagram of the shift-by-wire system having the motor controller in a sixth embodiment of the present disclosure.

According to the sixth embodiment, as shown in FIG. 14, the control section 61 has, instead of having the stop determiner 76 of the first embodiment, a position determiner 82. The position determiner 82 determines whether the rotation position of the motor 41 has reached a preset position, which is a position away from the target position in the backward rotation direction, after the start of rotation of the motor 41 by the backward driver 75.

The second forward driver 77 rotates the motor 41 in the forward rotation direction towards the target position, when an affirmative determination is made by the position determiner 82 (i.e., when the rotation position of the motor 41 reaches the preset position after the start of rotation of the motor 41 by the backward driver 75).

Figure 15:
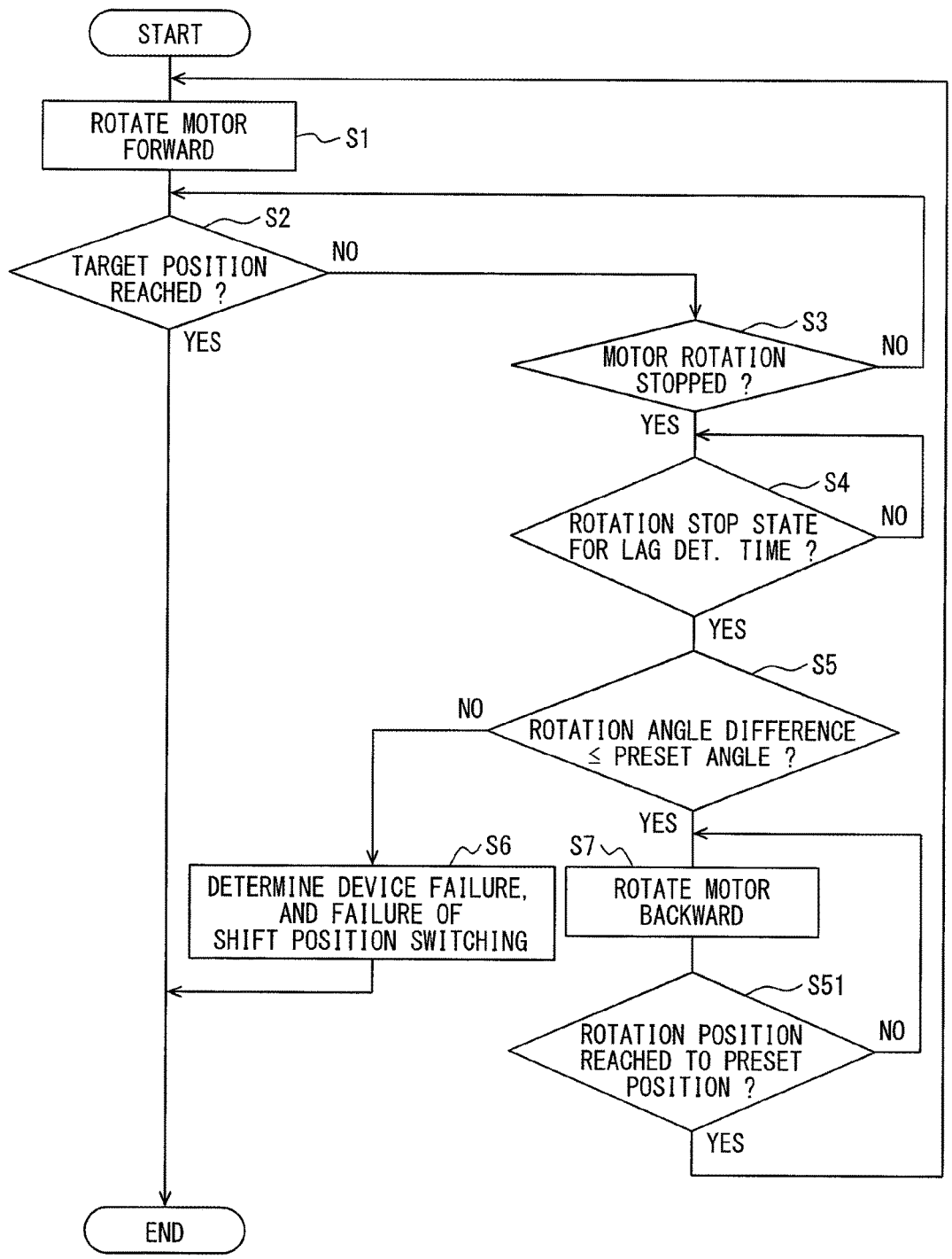
FIG. 15 is a flowchart of a process for switching a shift position by the motor controller in FIG. 14.

The process performed by the control section 61 in the sixth embodiment is described with reference to a flowchart shown in FIG. 15. In Step S51 of FIG. 15, which is performed after Step S7, the position determiner 82 determines whether the rotation position of the motor 41 has reached the preset position after the start of rotation of the motor 41 by the backward driver 75.

When it is determined that the rotation position of the motor 41 has reached the preset position (S51: YES), the process proceeds, i.e., returns, to Step S1.

When it is determined that the rotation position of the motor 41 has not reached the preset position (S51: NO), the process proceeds, i.e., returns, to Step S7.

As mentioned above, in the sixth embodiment, the position determiner 82 determines whether the rotation position of the motor 41 has reached the preset position after the start of rotation of the motor 41 by the backward driver 75. Then, the second forward driver 77 rotates the motor 41 in the forward rotation direction towards the target position, when an affirmative determination is made by the position determiner 82.

When the motor 41 is rotated too much in the backward rotation direction, i.e., when the engager 25 is pressed against the P wall 24 too strongly/forcefully, the rotation transmission part may possibly be damaged.

In consideration of such a damage, in the sixth embodiment, damage of the rotation transmission part is prevented by pressing the engager 25 against the P wall 24 with a minimum required force.

OTHER EMBODIMENTS

In other embodiments of the present disclosure, the number of the shift positions switched by the shift position switch mechanism may be three or more.

In other embodiments of the present disclosure, the motor may be a synchronous motor other than the switched-reluctance motor.

In other embodiments of the present disclosure, the encoder may be an encoder other than the magnetic type. The encoder may output the three or more signals.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A motor controller for controlling a motor that serves as a drive power source of a shift-by-wire system for a rotation drive of a drive object in a shift position switch mechanism of a vehicle, the motor controller comprising:
   a first forward driver configured to rotate the motor in a forward rotation direction that is defined as a direction from a start rotation position to a target rotation position according to a shift position switch instruction, the start rotation position defined as a rotation position of the motor at a start time of a switching of a shift position;
   a torque short determiner configured to determine whether a switch torque applied to the drive object for switching the shift position is less than a required magnitude based on the rotation position of the motor and the target rotation position, when the motor is under a rotation control to rotate in the forward rotation direction;
   a backward driver configured to rotate the motor to an extreme rotation position in a backward rotation direction that is defined as a direction from the target rotation position to the start rotation position, when the switch torque is determined to be less than the required magnitude; and
   a second forward driver configured to rotate the motor in the forward rotation direction from the extreme rotation position to the target rotation position.

2. The motor controller of claim 1, wherein
the torque short determiner is further configured to determine that the switch torque is less than the required magnitude, when a rotation stop state of the motor continues for a preset amount of lag determination time before the rotation position of the motor reaches the target rotation position.

3. The motor controller of claim 1, wherein
the torque short determiner is further configured to determine that the switch torque is less than the required magnitude, when a motor rotation direction is reversed before the rotation position of the motor reaches the target rotation position.

4. The motor controller of claim 1, wherein
the torque short determiner is further configured to determine that the switch torque is less than the required magnitude, when a preset amount of time has lapsed from a start of a motor rotation by the first forward driver before the rotation position of the motor reaches the target rotation position.

5. The motor controller of claim 1 further comprising:
a drive stopper configured to determine a failure in the shift position switching and to stop the rotation drive of the drive object, when a number of backward rotation operations of the motor by the backward driver exceed a preset value.

6. The motor controller of claim 1 further comprising:
a stop determiner configured to determine whether a rotation stop state of the motor has been kept for a preset amount of stop determination time, after a start of a motor rotation by the backward driver, wherein
the second forward driver is further configured to rotate the motor toward the target rotation position, when the stop determiner determines that the rotation stop state of the motor has been kept for the preset amount of stop determination time.

7. The motor controller of claim 1 further comprising:
a reverse determiner configured to determine whether a motor rotation has been reversed after a start of the motor rotation by the backward driver, wherein
the second forward driver is further configured to rotate the motor toward the target rotation position, when the reverse determiner determines that the motor rotation has been reversed after the start of the motor rotation by the backward driver.

8. The motor controller of claim 1 further comprising:
a time determiner configured to determine whether a preset drive time has lapsed after a start of the motor rotation by the backward driver, wherein
the second forward driver is further configured to rotate the motor toward the target rotation position, when the time determiner determines that the preset drive time has lapsed after the start of the motor rotation by the backward driver.

9. The motor controller of claim 1 further comprising:
a position determiner configured to determine whether the rotation position of the motor has reached a preset rotation position that is away from the target rotation position in the backward rotation direction, wherein
the second forward driver is further configured to rotate the motor toward the target rotation position, when the position determiner determines that the rotation position of the motor has reached the preset rotation position.

10. A motor controller for a vehicle, the motor controller comprising:
   a first forward driver configured to rotate a motor in a forward rotation direction that is defined as a direction from a start rotation position to a target rotation position according to a shift position switch instruction, the start rotation position defined as a rotation position of the motor at a start time of a switching of a shift position;

a torque short determiner configured to determine whether a switch torque applied to a drive object for switching the shift position is less than a required magnitude based on the rotation position of the motor and the target rotation position, when the motor is under a rotation control to rotate in the forward rotation direction;

a backward driver configured to rotate the motor to an extreme rotation position in a backward rotation direction that is defined as a direction from the target rotation position to the start rotation position, when the switch torque is determined to be less than the required magnitude; and a second forward driver configured to rotate the motor in the forward rotation direction from the extreme rotation position to the target rotation position.

* * * * *